(12) United States Patent
Kikuchi (10) Patent No.: US 10,556,557 B2
(45) Date of Patent: Feb. 11, 2020

(54) MOVING OBJECT

(71) Applicant: Sharp Kabushiki Kaisha, Sakai, Osaka (JP)

(72) Inventor: Yoshiteru Kikuchi, Sakai (JP)

(73) Assignee: SHARP KABUSHIKI KAISHA, Sakai, Osaka (JP)

(\*) Notice: Subject to any disclaimer, the term of this patent is extended or adjusted under 35 U.S.C. 154(b) by 0 days.

(21) Appl. No.: 15/717,793

(22) Filed: Sep. 27, 2017

(65) Prior Publication Data
US 2018/0093624 A1    Apr. 5, 2018

(30) Foreign Application Priority Data
Sep. 30, 2016 (JP) ................ 2016-193286

(51) Int. Cl.
| | | |
|---|---|---|
| *B60R 16/023* | (2006.01) | |
| *B60R 16/02* | (2006.01) | |
| *G01T 7/00* | (2006.01) | |
| *B60R 11/00* | (2006.01) | |

(52) U.S. Cl.
CPC .......... *B60R 16/0239* (2013.01); *B60R 11/00* (2013.01); *B60R 16/0215* (2013.01); *B60R 16/0237* (2013.01); *G01T 7/00* (2013.01); *B60R 2011/004* (2013.01); *B60Y 2200/40* (2013.01)

(58) Field of Classification Search
CPC . B60R 16/0239; B60R 11/00; B60R 16/0237; B60R 16/0215; B60R 2011/004; G01T 7/00; B60Y 2200/40; B62D 63/02; B62D 63/04; G01D 11/245
See application file for complete search history.

(56) References Cited

U.S. PATENT DOCUMENTS

| | | | |
|---|---|---|---|
| 7,636,154 B1\* | 12/2009 | LaValley | G01J 3/02 356/301 |
| 2004/0163462 A1 | 8/2004 | Zurek et al. | |
| 2016/0178395 A1\* | 6/2016 | Ikeda | G01D 5/142 324/207.11 |
| 2018/0038717 A1\* | 2/2018 | Vidal | G01D 11/245 |

FOREIGN PATENT DOCUMENTS

| | | | | |
|---|---|---|---|---|
| CN | 104228998 A | 12/2014 | | |
| DE | 102017209492 A1 \* | 6/2017 | ........... | B60R 19/483 |
| JP | S61-110678 A | 5/1986 | | |
| JP | 2002-71437 A | 3/2002 | | |

\* cited by examiner

*Primary Examiner* — Michael C Bryant
(74) *Attorney, Agent, or Firm* — ScienBiziP, P.C.

(57) ABSTRACT

A moving object includes a box-shaped accommodation unit provided on an outer surface of an automobile body, and moves on a road surface. The accommodation unit detachably accommodates a detection device that detects suspended matters or radiation in the air nearby the automobile body.

11 Claims, 9 Drawing Sheets

MOVING OBJECT

BACKGROUND

1. Field

The present disclosure relates to a moving object including an accommodation unit which accommodates a detection device.

2. Description of the Related Art

In recent years, various forms of moving objects that move autonomously are proposed, and a variety of devices are mounted on a moving object according to the application purpose. In a case that a device is desired to be mounted in advance at an appropriate position in consideration for the operation, a unit that indicates the position at which the device is to be mounted may be provided (for example, refer to Japanese Unexamined Patent Application Publication No. 2002-71437).

A load measuring device disclosed in Japanese Unexamined Patent Application Publication No. 2002-71437 includes a load sensor that detects a load based on deformation of a member to be loaded. Positioning guide projections that indicate the position of the load sensor to be mounted are provided on the member to be loaded. However, it is difficult to mount all desired members in a limited space by merely indicating the position of the load sensor with the positioning guide projections and accordingly space-saving is difficult to be realized. In addition, it is desirable for some devices to be accommodated in a container to avoid damage caused by coming into contact with an object.

SUMMARY

The present disclosure is made to solve the above problem and it is desirable to provide a moving object accommodating a detection device that is easily detachably attached.

According to the disclosure, there is provided a moving object that moves on a road surface and includes a box-shaped accommodation unit which is provided on an outer surface of an automobile body. The accommodation unit detachably accommodates a detection device, which detects suspended matters or radiation in the air nearby the automobile body.

DESCRIPTION OF THE EMBODIMENTS

Hereinafter, a moving object according to an embodiment of the disclosure will be described with reference to the drawings.

Figure 1A:
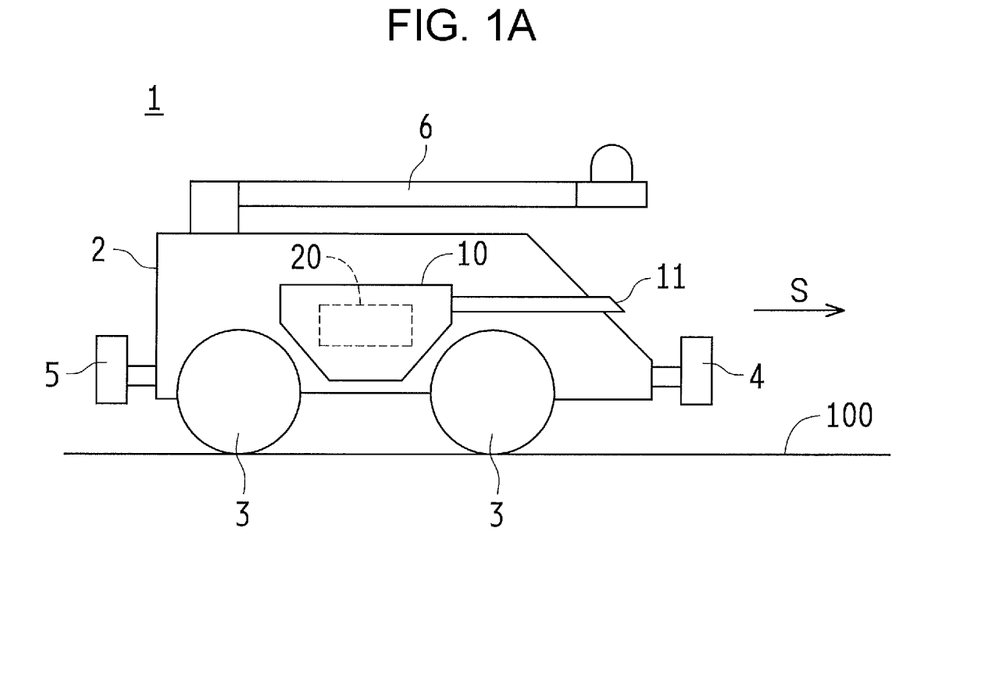
FIG. 1A is a schematic side view of a moving object according to an embodiment of the disclosure.
Figure 1B:
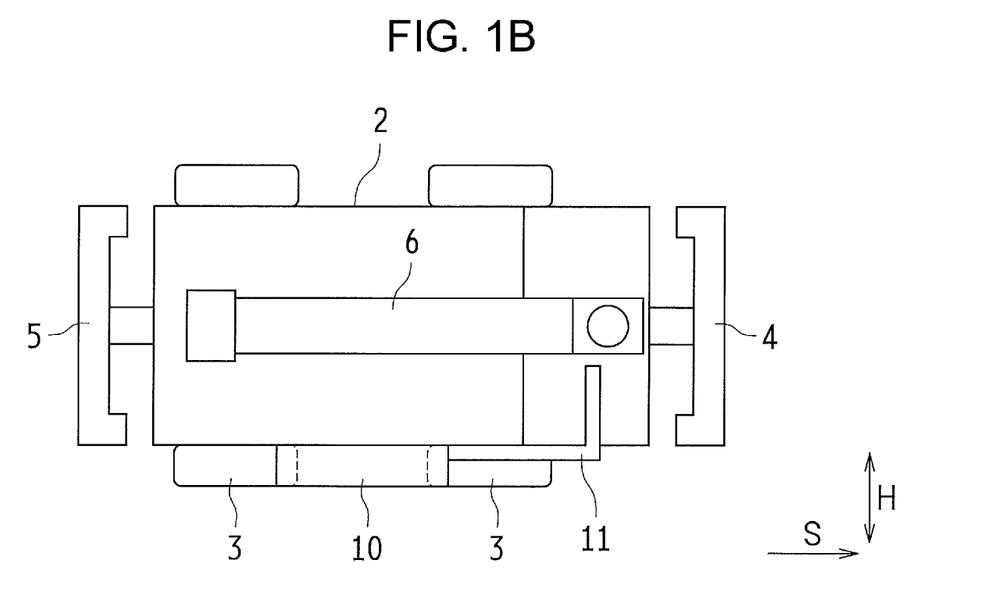
FIG. 1B is a schematic top view of the moving object illustrated in FIG. 1A.

FIG. 1A is a schematic side view of the moving object according to the embodiment of the disclosure, and FIG. 1B is a schematic top view of the moving object illustrated in FIG. 1A.

A moving object 1 according to the embodiment of the disclosure is a four-wheeled vehicle that moves on a road surface 100 along a route set in advance. The moving object 1 goes straight toward the front (the right in FIG. 1A) in general, and a direction in which the moving object travels is changed as appropriate. Hereinafter, for the simplicity of description, the direction in which the moving object 1 travels will be referred to as a traveling direction S, a direction in which a front surface of an automobile body 2 faces will be simply referred to as a forward direction, and a direction in which a rear surface of the automobile body 2 faces (the left in FIG. 1A) will be simply referred to as the rear, in some cases.

The automobile body 2 includes wheels 3, a front bumper 4, a rear bumper 5, an arm 6, and a sensor case 10 (accommodation unit).

The wheels 3 are connected to a drive source, such as a motor, which is accommodated in the automobile body 2, and the moving object 1 travels by driving the wheels 3. A configuration in which four wheels 3 are included is adopted in the embodiment. Without being limited thereto, however, the number of wheels 3 may be changed, a belt may be used, or a configuration in which the moving object 1 moves and a traveling speed thereof can be regulated as appropriate may be adopted.

The front bumper 4 is mounted on a front surface of the automobile body 2, and reduces damage to the automobile body 2, which is caused by coming into contact with obstacles. The rear bumper 5 is mounted on the rear surface of the automobile body 2, and has substantially the same function as that of the front bumper 4.

One end of the arm 6 is mounted on a top surface of the automobile body 2, and the other end is a long member including a monitoring device, such as a camera and a sensor. The arm 6 is configured so as to rotate about a portion on which the arm portion is mounted on the automobile body 2, and the monitoring device provided on the other end can be moved in an up-and-down direction due to the rotation of the arm 6.

The sensor case 10 is mounted on a side surface of the automobile body 2, and the sensor case 10 of a box-shape detachably accommodates a detection device 20. An outer surface on which the sensor case 10 is mounted is not limited to the side surface, and may be the front surface or the top surface of the automobile body 2.

The sensor case 10 may be provided between the wheels 3 on a front side (front wheels) and the wheels 3 on a rear side (rear wheels). A tube 11 extends from the sensor case 10 toward the front surface of the automobile body 2. The tube 11 is provided along the automobile body 2 and sends air taken in from a tip thereof to the detection device 20. As illustrated in FIG. 1B, the width of the sensor case 10 protruding from the automobile body 2 in a width direction H orthogonal to the side surface on which the sensor case is mounted may be substantially the same as the widths of the wheels 3. That is, the sensor case 10 can avoid being obstructed by obstacles since the sensor case 10 does not protrude more than the wheels 3 in the width direction H. Next, a specific structure of the sensor case 10 will be described in detail with reference to FIG. 2A and FIG. 2B.

Figure 2A:
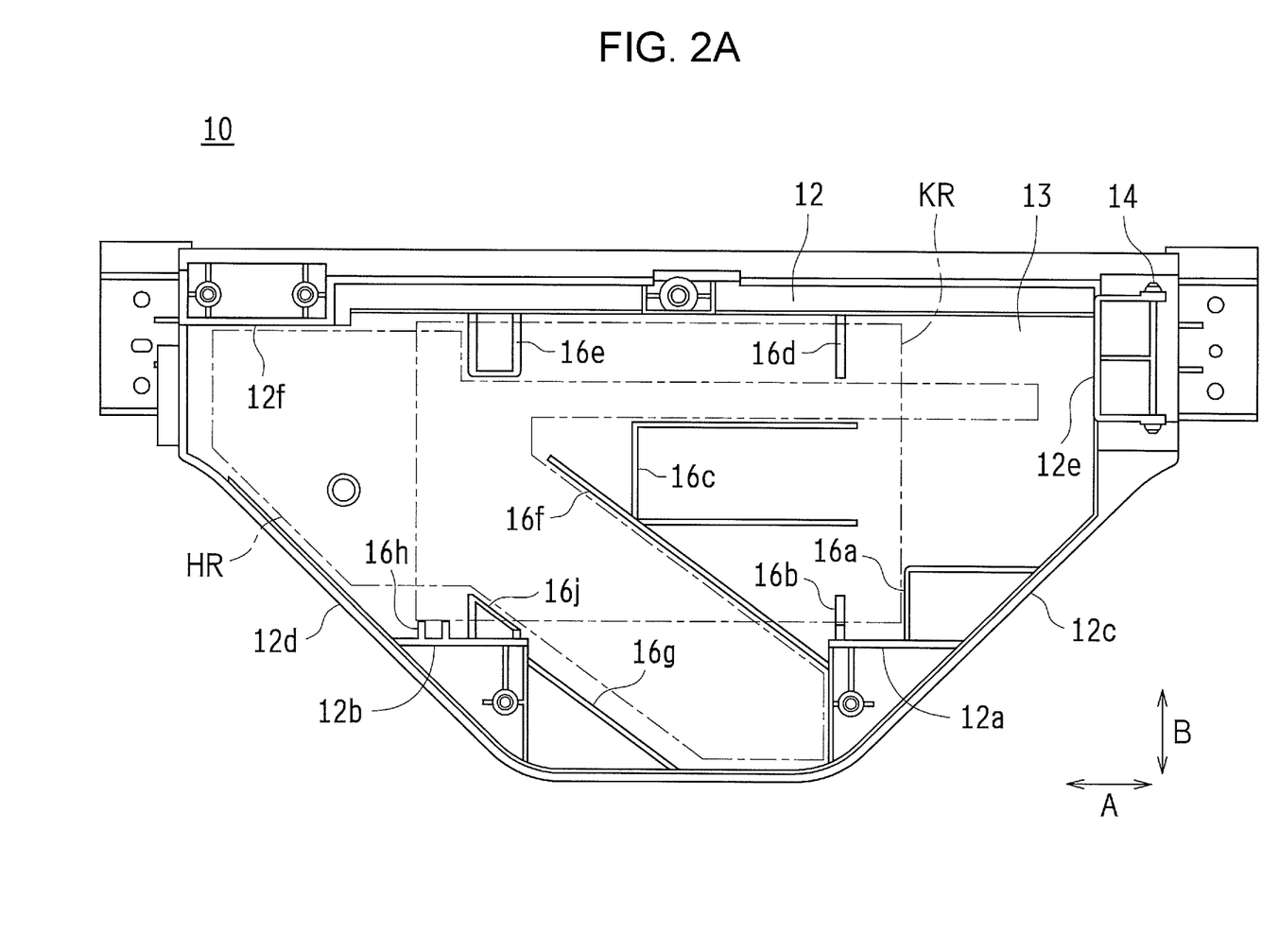
FIG. 2A is a front view of a sensor case according to a first embodiment of the disclosure.
Figure 2B:
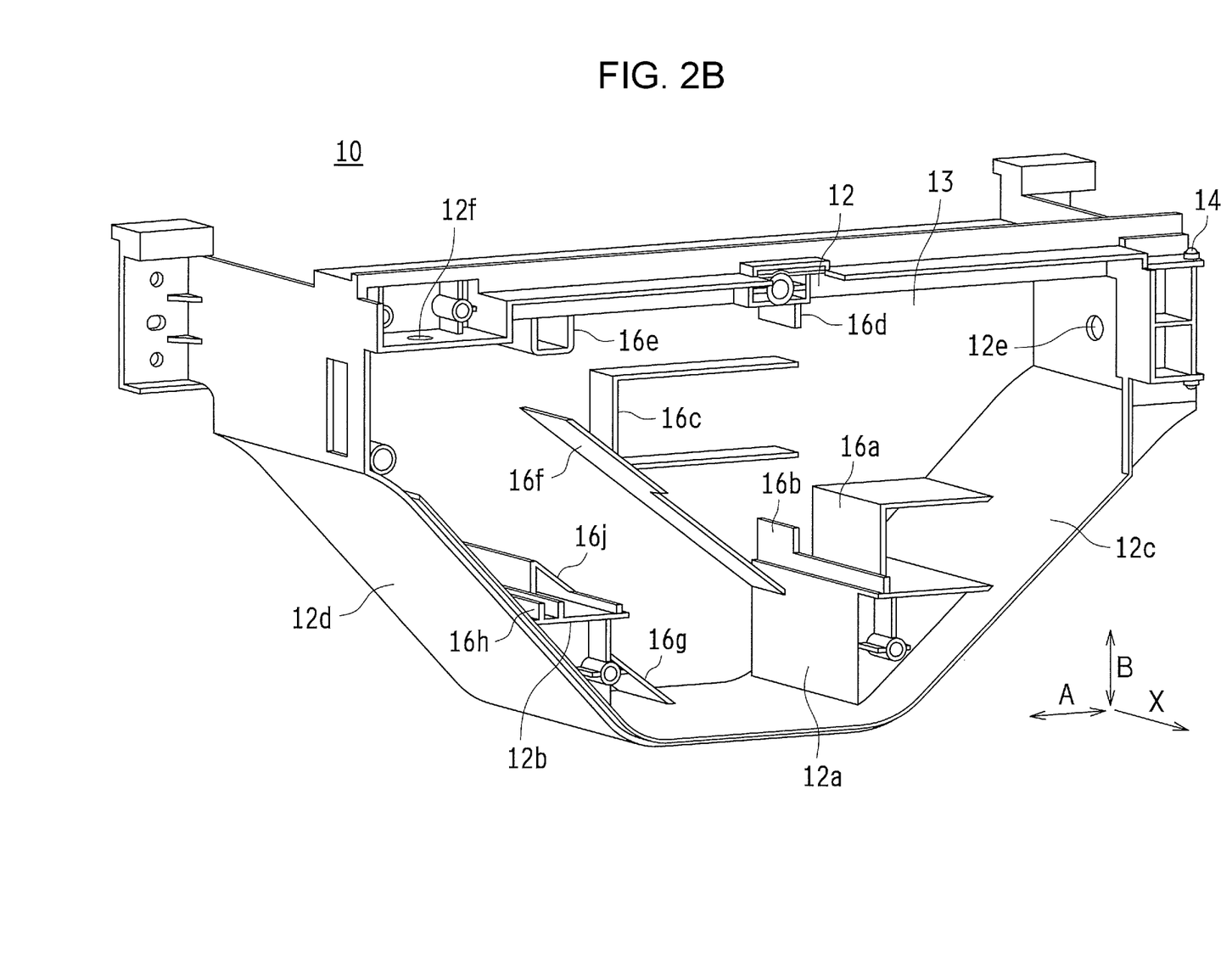
FIG. 2B is a perspective view of the sensor case illustrated in FIG. 2A.

FIG. 2A is a front view of a sensor case according to a first embodiment of the disclosure, and FIG. 2B is a perspective view of the sensor case illustrated in FIG. 2A. FIG. 2A and FIG. 2B illustrate the sensor case 10 in a state where a housing door 17 is removed (refer to FIG. 6 which will be described later), for ease of viewing the drawings.

The sensor case 10 is a substantially rectangular container and a front surface of the sensor case may be an opening portion. The sensor case 10 is a quadrangle, of which two corners on one side are cut off, in front view. Specifically, when the sensor case 10 is mounted on the automobile body 2, corners on a lower side (downward in FIG. 2A) may be cut off, slopes (front slope 12c and rear slope 12d) may be formed, and the wheels 3 may be provided at positions corresponding to the cut off corners. Accordingly, the sensor case 10 can be easily mounted even in a case where an interval between the wheels 3 is short. For the sake of description below, a direction along the front and rear of the automobile body 2 will be referred to as a horizontal direction A, a direction along the top and bottom of the automobile body 2 will be referred to as a vertical direction B, and a direction from the inside of the sensor case 10 to the outside through the opening portion will be referred to as a placement direction X.

A housing of the sensor case 10 is configured of a case side wall 12 and a case bottom plate 13. A door mounting portion 14 for mounting the housing door 17, and a first protruded portion 12a and a second protruded portion 12b, which protrude to an inner side of the sensor case 10 are provided on the case side wall 12.

The first protruded portion 12a is provided on a corner on a front lower side (lower right corner of the sensor case 10 in FIG. 2A) when mounted on the automobile body 2, and the second protruded portion 12b is provided on a corner on a rear lower side (lower left corner of the sensor case 10 in FIG. 2A) when mounted on the automobile body 2. The first protruded portion 12a and the second protruded portion 12b are formed so as to be slightly shorter than the case side wall 12 in the placement direction X, and have heights of approximately 80 percent of the height of the case side wall 12.

A wiring hole 12f, through which a wiring member 40 (refer to FIG. 3 which will be described later) passes, and a tube hole 12e, through which the tube 11 passes, may be further provided in the case side wall 12. A part of the case bottom plate 13 may be extended to an outer side of the case side wall 12, and a screw hole for fixing to the automobile body 2 may be provided in the case bottom plate as appropriate. The door mounting portion 14 is formed so as to protrude toward the outer side from an end portion of the case side wall 12 in the horizontal direction A.

A detection accommodation region KR in which the detection device 20 is accommodated, a wiring accommodation region HR in which the wiring member 40 connected to the detection device 20 is accommodated, a plurality of detection ribs extended from the case bottom plate 13 in the placement direction X may be provided in the sensor case 10. The detection ribs are respectively provided at positions facing outer edges of the detection accommodation region KR and the wiring accommodation region HR, and the detection ribs are provided at nine places in the embodiment. Next, first rib 16a to ninth rib 16j, which are the plurality of detection ribs, will be described in detail. As for the detection ribs, a surface orthogonal to the placement direction X will be referred to as a top surface and a surface parallel to the placement direction X will be referred to as a side surface.

The first rib 16a is positioned at a corner where the first protruded portion 12a is provided. One end thereof linked to the case side wall 12 extends in the horizontal direction A. The first rib bends in the vertical direction B halfway to the first protruded portion. The other end is linked to the first protruded portion 12a. The first rib 16a has substantially the same height as that of the first protruded portion 12a.

One end of the second rib 16b is linked to the first protruded portion 12a, and the other end thereof extends to an opposing side of the case side wall 12 in the vertical direction B (upward in FIG. 2A). A step is provided on a top surface of the second rib 16b in the placement direction X, a portion linked to the first protruded portion 12a has substantially the same height as that of the first protruded portion 12a, and a side on the other end thereof has a height approximately 30 percent of the height of the case side wall 12.

In front view, the third rib 16c is formed in a U-shape, is positioned substantially in the middle of the case bottom plate 13, and has a height of approximately 30 percent of the height of the case side wall 12. The third rib 16c is disposed so as to have side surfaces opposing a part of the case side wall 12 (upper side of the sensor case 10 in FIG. 2A).

The fourth rib 16d extends from a position opposing the second rib 16b in the vertical direction B on the case side wall 12 and has a height of approximately 30 percent of the height of the case side wall 12. The side surfaces of the third rib 16c and a tip of the fourth rib 16d are provided so as to be oppose each other with the wiring accommodation region HR being interposed therebetween.

The fifth rib 16e extends from a position opposing the second protruded portion 12b in the vertical direction B on the case side wall 12, and has a height of approximately 30 percent of the height of the case side wall 12.

One end of the sixth rib 16f is linked to the first protruded portion 12a, and the other end thereof extends to substantially the middle of the case bottom plate 13 in a direction oblique to the horizontal direction A in front view. A step is provided on a top surface of the sixth rib 16f in the placement direction X, a portion linked to the first protruded portion 12a has a height of approximately 30 percent of the height of the case side wall 12, a side on the other end is slightly larger taller.

One end of the seventh rib 16g is linked to the second protruded portion 12b, the other end thereof extends in the direction oblique to the horizontal direction A, and the seventh rib is linked to the case side wall 12 on a lower side when mounted on the automobile body 2. The seventh rib 16g has a height of approximately 30 percent of the height of the case side wall 12. The sixth rib 16f and the seventh rib 16g are provided such that side surfaces oppose each other in parallel with the wiring accommodation region HR being interposed.

The eighth rib 16h extends from the second protruded portion 12b in the vertical direction B, and has substantially the same height as that of the second protruded portion 12b.

The ninth rib 16j extends from the second protruded portion 12b in the vertical direction B, a step is provided in the placement direction X, a portion thereof linked to the second protruded portion 12b has substantially the same height as that of the second protruded portion 12b, and a tip thereof has a height of approximately 30 percent of the height of the case side wall 12. The fifth rib 16e and the ninth rib 16j are provided at positions opposing each other in the vertical direction B.

Figure 4:
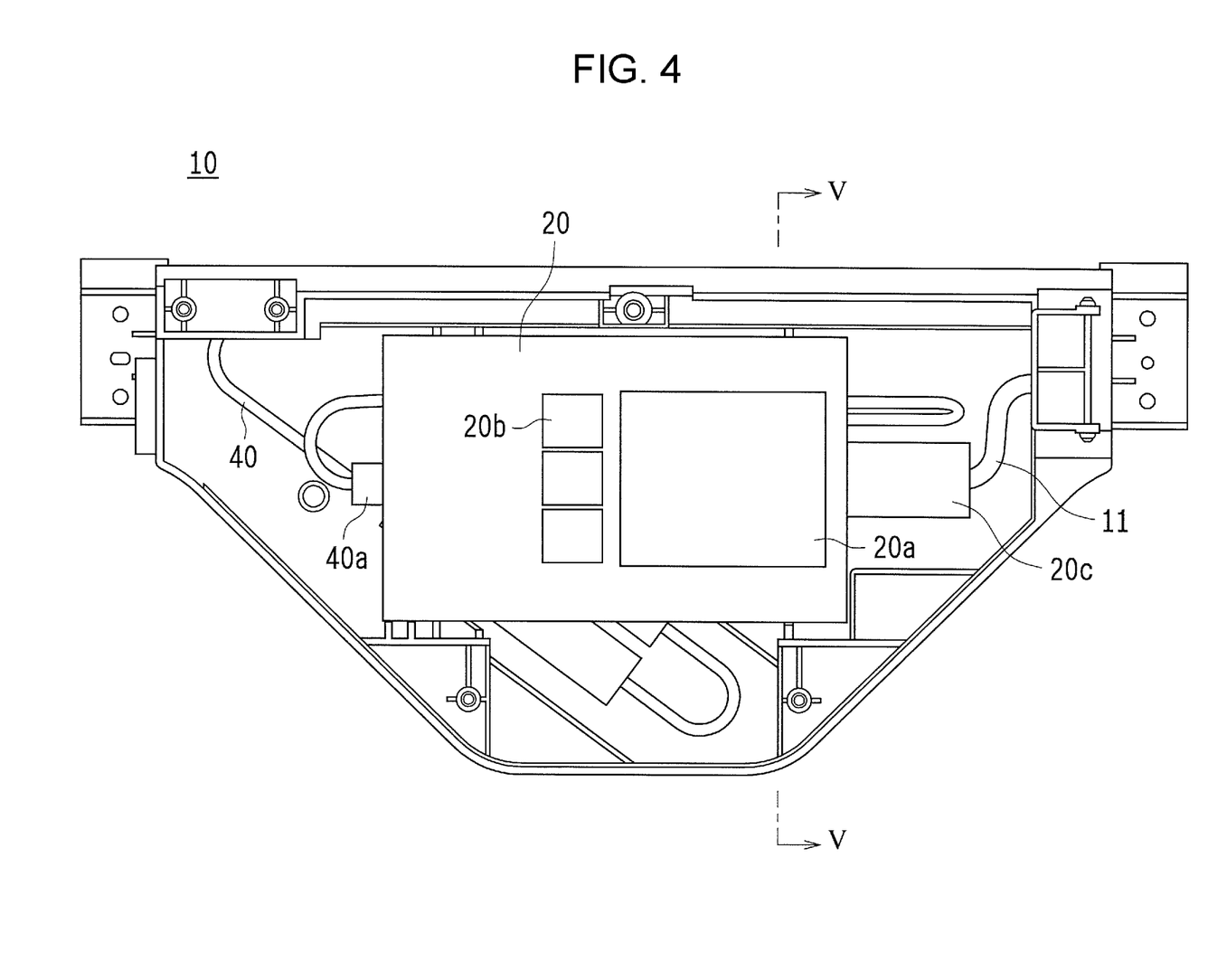
FIG. 4 is a front view illustrating the sensor case accommodating a detection device and the wiring member.
Figure 5:
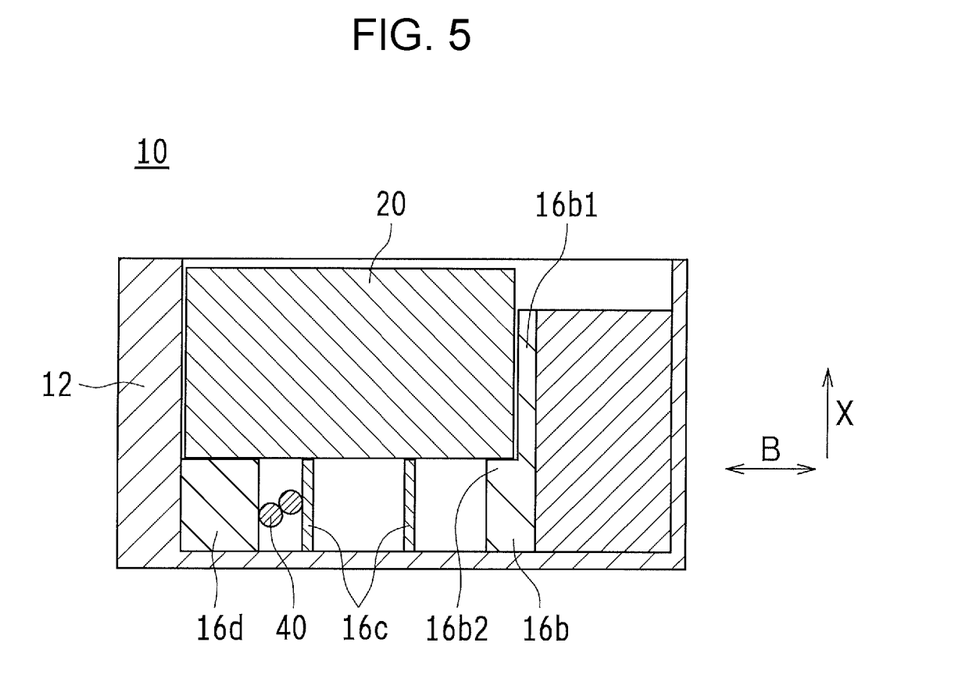
FIG. 5 is a sectional view taken along arrow V-V of FIG. 4.

As illustrated in FIG. 2A, although the detection accommodation region KR and the wiring accommodation region HR are provided at overlapping positions in front view, the positions of the detection accommodation region KR and the wiring accommodation region HR may be different from each other in the placement direction X. Specifically, the wiring accommodation region HR is provided on a side close to the case bottom plate 13 in the placement direction X, and the detection accommodation region KR is provided on a side separated away from the case bottom plate 13. That is, the sensor case 10 has a structure in which the detection accommodation region KR is stacked on the wiring accommodation region HR with the case bottom plate 13 as the base in the placement direction X. Structures of the wiring accommodation region HR and detection accommodation region KR will be described in detail together with the wiring member 40 and the detection device 20, which are illustrated in FIG. 3 to FIG. 5.

Figure 3:
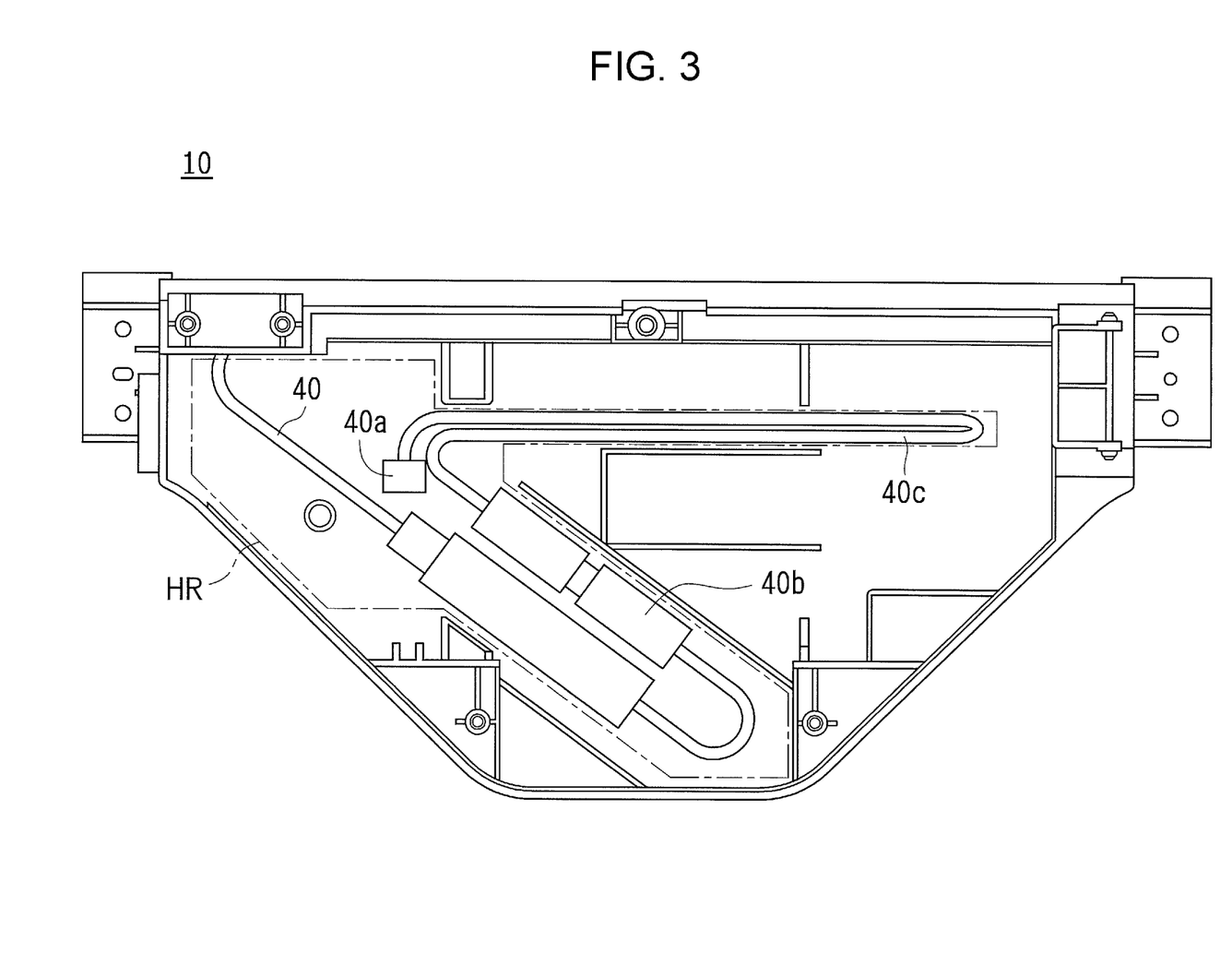
FIG. 3 is a front view illustrating the sensor case accommodating a wiring member.

FIG. 3 is a front view illustrating the sensor case accommodating a wiring member.

FIG. 3 illustrates a state where the sensor case 10 illustrated in FIG. 2A accommodates the wiring member 40. The wiring accommodation region HR is a space enclosed with the case side wall 12, the third rib 16c, the fourth rib 16d, the fifth rib 16e, the sixth rib 16f, the seventh rib 16g, and the ninth rib 16j (an example of a wiring restriction unit which will be described later). That is, the side surfaces of the detection ribs face outer edges of the wiring accommodation region HR.

The wiring member 40 is passed from the outside of the sensor case 10 to the inside of the sensor case through a hole, and a connection portion 40a for connecting to the detection device 20 is provided on a tip of the wiring member. Although the wiring member 40 is, for example, a power cable or a LAN cable, the wiring member is not limited to wiring and may include a connector 40b for exchanging signals. The movement of the wiring member 40 is restricted by the wiring member being in contact with the side surfaces of the detection ribs as appropriate, and thereby the wiring member can be accommodated well. That is, the detection ribs may include the wiring restriction units that position the wiring member 40 in restriction directions (horizontal direction A and vertical direction B) orthogonal to the placement direction X. The wiring member 40 is illustrated short in FIG. 3 for ease of viewing. Without being limited thereto, however, a long wiring member 40 may be accommodated so as to overlap itself.

As described above, the wiring member 40 has a long cable 40c that is connected to and is integrated with connector 40b. A cable accommodation unit that accommodates the cable 40c of the wiring member 40 and a connector accommodation unit that accommodates the connector 40b of the wiring member 40 may be provided in the wiring accommodation region HR. End portions of the cable accommodation unit and the connector accommodation unit may be linked to each other, and the cable accommodation unit and the connector accommodation unit may extend along the case bottom plate 13 in directions different from each other. In the embodiment, a space interposed among the third rib 16c, the fourth rib 16d, and the fifth rib 16e corresponds to the cable accommodation unit, and a space interposed between the sixth rib 16f and the seventh rib 16g corresponds to the connector accommodation unit. In this manner, by efficiently accommodating the long wiring member 40 with the wiring member being folded, the space-saving of the sensor case 10 can be achieved.

FIG. 4 is a front view illustrating the sensor case accommodating the detection device and the wiring member, and FIG. 5 is sectional view taken along arrow V-V of FIG. 4.

FIG. 4 illustrates a state where the detection device 20 is further accommodated in the sensor case 10 which accommodates the wiring member 40 illustrated in FIG. 3. The detection device 20 is an air sensor, and is a chemical sensor that detects suspended matters in the air which is taken in. Without being limited thereto, the detection device 20 may be a radioactivity sensor that detects radioactivity. The detection device 20 includes a display unit 20a that displays detection results and setting, an operation unit 20b for a user to operate, and a nozzle 20c connected to the tube 11. The detection device 20 is substantially rectangular, and has substantially the same shape as that of the detection accommodation region KR.

When placing the detection device 20 so as to be accommodated in the sensor case 10, an adaptor (not illustrated) is mounted first on a tip of the tube 11 and then the adaptor is mounted on the nozzle 20c. After then, the detection device 20 is accommodated in the sensor case.

As illustrated in FIG. 2A, the detection accommodation region KR is substantially rectangular and is positioned substantially in the middle of the sensor case 10, in front view. A side surface of the first rib 16a faces the detection accommodation region KR (lower right corner of the detection accommodation region KR in FIG. 2A) in the horizontal direction A. The step on the top surface of the second rib 16b faces the detection accommodation region KR. Specifically, in the second rib 16b, a side surface of a second rib high portion 16b1 which has substantially the same height as that of the first protruded portion 12a faces the detection accommodation region KR in the vertical direction B, and a top surface of a second rib low portion 16b2 formed so as to be shorter faces the detection accommodation region KR in the placement direction X. Top surfaces of the third rib 16c to the sixth rib 16f face the detection accommodation region KR in the placement direction X. A side surface of the eighth rib 16h faces the detection accommodation region KR (lower left corner of the detection accommodation region KR in FIG. 2A) in the vertical direction B. The step on a top surface of the ninth rib 16j faces the detection accommodation region KR, as in the second rib 16b. That is, in the ninth rib 16j, a higher portion faces the detection accommodation region KR in the vertical direction B, and a lower portion faces the detection accommodation region KR in the placement direction X.

A side of the detection accommodation region KR on an upper side (upper side of the detection accommodation region KR in FIG. 2A) faces the case side wall 12 when mounted on the automobile body 2. That is, a part of the case side wall 12 may function as a detection rib. A projection may be provided on a portion of the case side wall 12 facing the detection accommodation region KR, thereby identifying a portion in contact with the detection device 20.

The detection ribs may include back surface abutting units that position the detection device 20 in the placement direction X. Specifically, since the detection device 20 is placed on the second rib 16b, the third rib 16c, the fourth rib 16d, the fifth rib 16e, the sixth rib 16f, and the ninth rib 16j (one example of the back surface abutting unit) in the placement direction X, a space is provided below and the detection device is at a position of not overlapping the wiring member 40. In this configuration, the detection device 20 and the wiring member 40 can be accommodated in the sensor case 10 by dividing the sensor case into two stages, the inside space can be used effectively, and space-saving can be achieved.

In addition, by the detection device 20 being in contact with the first rib 16*a*, the second rib 16*b*, the eighth rib 16*h*, the ninth rib 16*j*, and the case side wall 12 (one example of a detection restriction unit), shaking in the horizontal direction A and the vertical direction B is restricted.

In the configuration described above, a user who performs mounting work for the detection device 20 can clearly see an accommodation place of each member and can easily carry out mounting work. In addition, an effect of vibration, which is caused by the movement of the moving object 1, on the detection device 20 can be reduced by providing an accommodation place for each member.

A protruded portion such as a clip provided on a back surface of the detection device 20 can be accommodated in an inner side of the third rib 16*c*, and the detection accommodation region KR and the wiring accommodation region HR may be partitioned with detection ribs.

In addition, the disposition of the detection ribs is not limited to the above description, the disposition and the number of detection ribs may be changed according to the shapes of the detection accommodation region KR and the wiring accommodation region HR.

Figure 6:
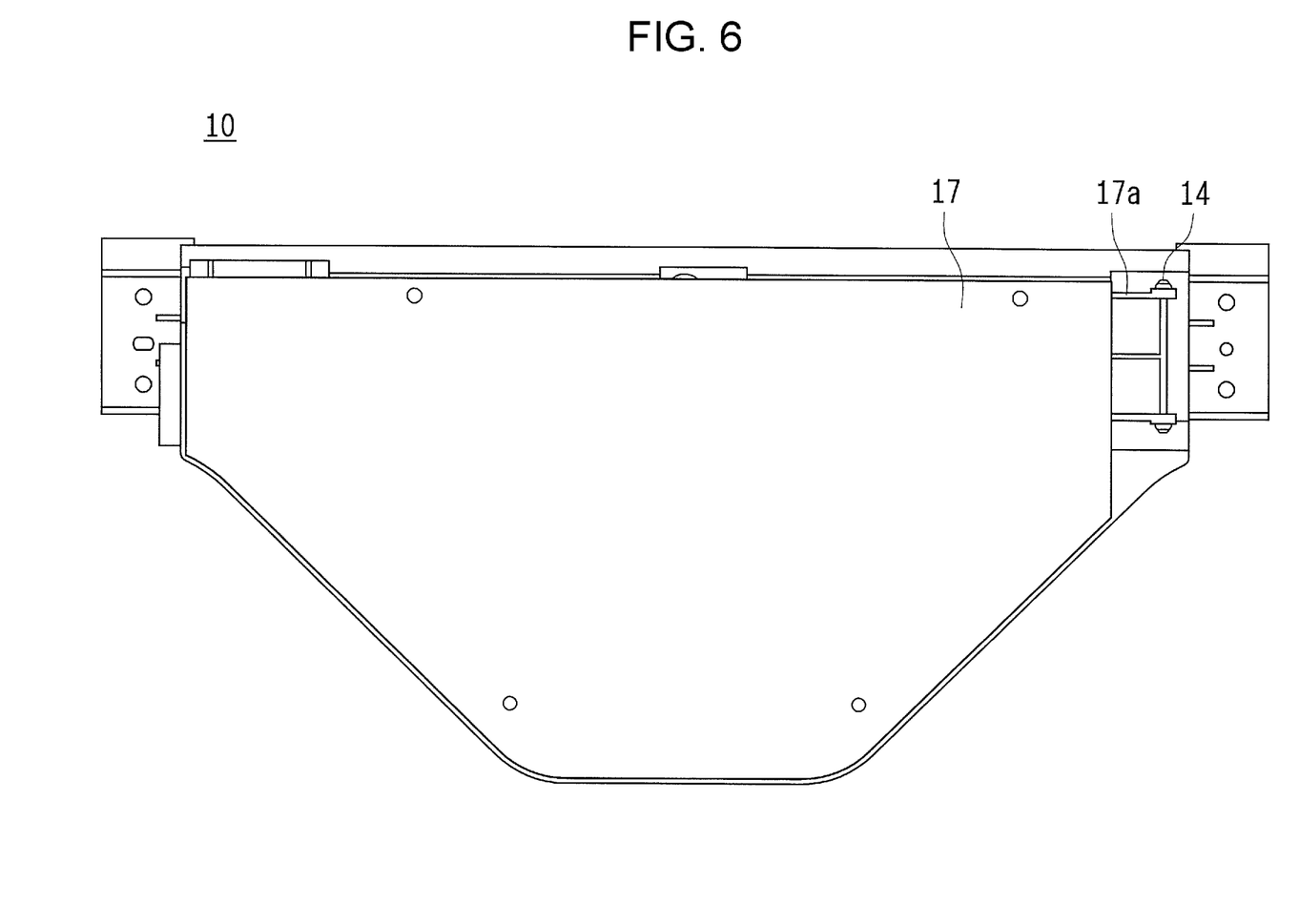
FIG. 6 is a front view illustrating the sensor case of which a housing door is closed.

FIG. 6 is a front view illustrating the sensor case where the housing door is closed.

FIG. 6 illustrates a state where the housing door 17 is closed with respect to FIG. 5. In front view, the housing door 17 has a shape along the case side wall 12, and a housing door connection portion 17*a* extended from an end portion of the housing door is mounted on the door mounting portion 14. The housing door 17 may have a structure in which the housing door is openable and closable with the housing door connection portion 17*a* as a starting point. Therefore, by providing the housing door 17, the mounted detection device 20 can be reliably accommodated in the sensor case 10. The housing door 17 is fixed by a screw so as not to be opened after the detection device 20 is accommodated.

As illustrated in FIG. 1A described above, the sensor case 10 may be mounted on the side surface different from a front surface of the moving object 1. Therefore, when a user mounts the detection device 20, the work is performed from a side different from the traveling direction S of the moving object 1. Thus, a possibility that the detection device comes into contact with the front surface of the moving object in a case where the moving object 1 starts moving by mistake can be reduced.

Figure 7:
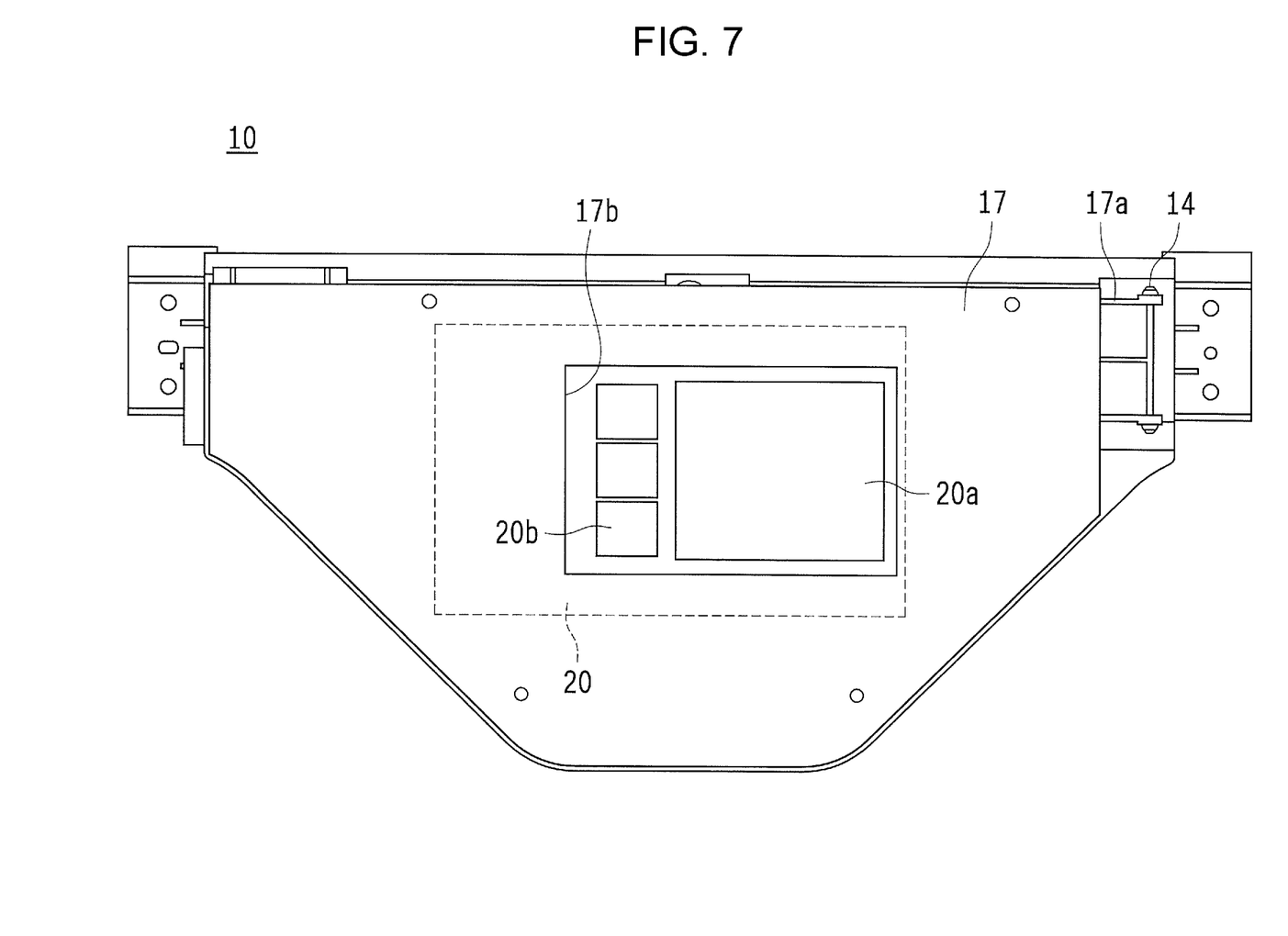
FIG. 7 is a front view of a sensor case according to a second embodiment of the disclosure.

FIG. 7 is a front view of a sensor case according to a second embodiment of the disclosure. Configuration elements of which functions are practically equal to those of the configuration elements in the first embodiment will be assigned with the same reference signs and description thereof will be omitted.

The second embodiment is different from the first embodiment in terms of the structure of the housing door 17. Specifically, in the second embodiment, a door opening window 17*b*, which is obtained by opening a portion at a position corresponding to a part of the detection device 20, may be provided in the housing door 17. Therefore, the detection device 20 can be checked even in a state where the housing door 17 is closed, by providing the door opening window 17*b*. The door opening window 17*b* is provided so as to expose the display unit 20*a* and the operation unit 20*b* in the embodiment. Without being limited thereto, however, a configuration in which any one of the display unit 20*a* and the operation unit 20*b* is exposed may be adopted.

Figure 8:
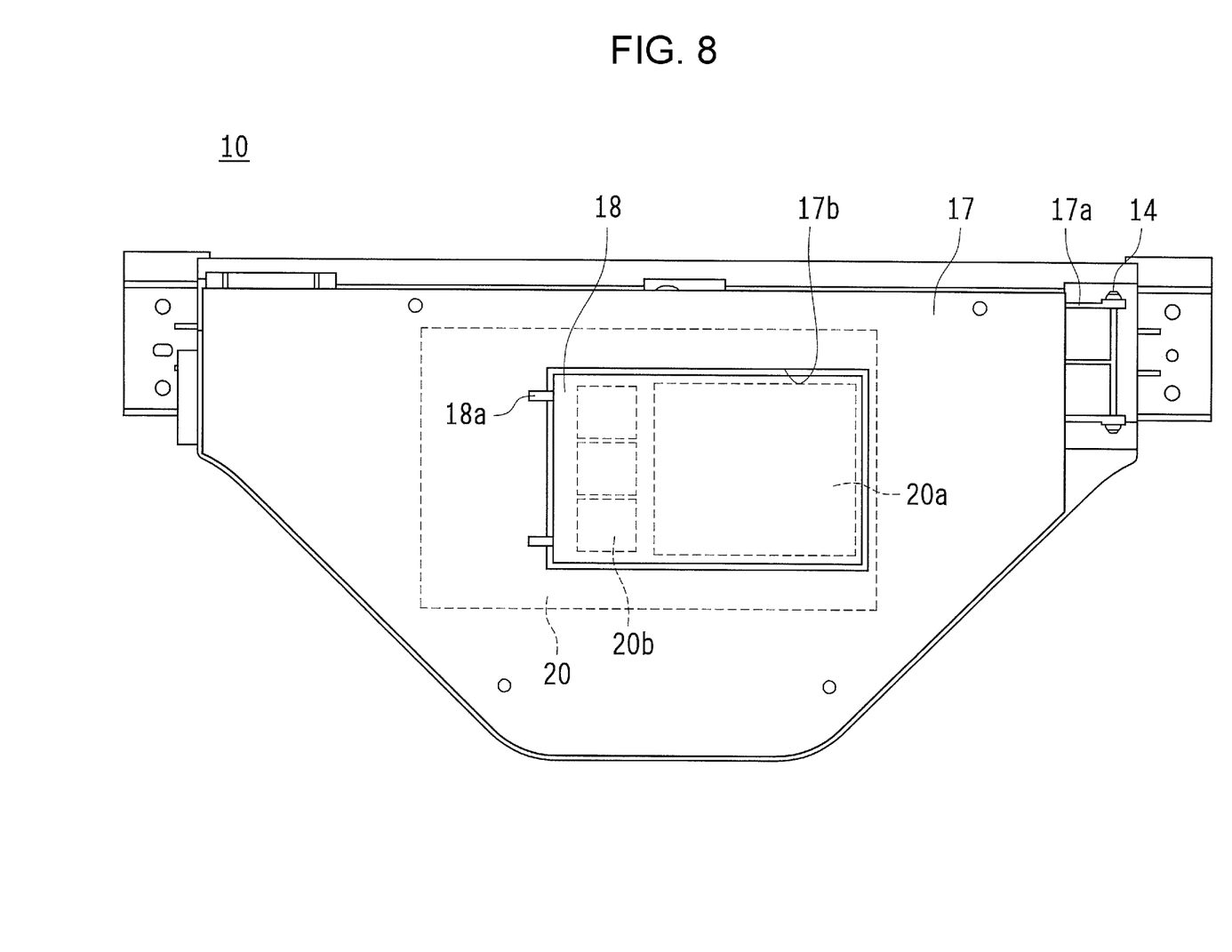
FIG. 8 is a front view of a sensor case according to a third embodiment of the disclosure.

FIG. 8 is a front view of a sensor case according to a third embodiment of the disclosure. Configuration elements of which functions are practically equal to those of the configuration elements in the first embodiment and the second embodiment will be assigned with the same reference signs and description thereof will be omitted.

The third embodiment is different from the second embodiment in terms of the structure of the housing door 17. Specifically, an auxiliary door 18 corresponding to the door opening window 17*b* is provided in the third embodiment. The auxiliary door 18 has a structure in which an auxiliary door connection portion 18*a* extended from an end portion is mounted on the housing door 17 and the auxiliary door is openable and closable with the auxiliary door connection portion 18*a* as a starting point. That is, the detection device 20 can be checked and accommodated together by providing the auxiliary door connection portion 18*a*.

A case where there is one housing door 17 is described in the first embodiment to the third embodiment. Without being limited thereto, however, a structure in which the housing door 17 is a double door may be adopted. That is, a structure in which the housing door 17 illustrated in FIG. 7 is overlaid with the housing door 17 illustrated in FIG. 6 may be adopted.

In addition, the color of an exterior surface of the sensor case 10 may be substantially the same as the color of the wheels 3. In the embodiment, the color of the exterior surface is black, which is the same as that of the wheels 3. In particular, by the housing door 17 having substantially the same color as the color of the wheels 3, unity can be created and the housing door can be made inconspicuous.

The embodiments disclosed herein are examples in all respects and do not serve as a basis for limited interpretation. Therefore, the technical scope of the disclosure is not interpreted only by means of the embodiments described above and is defined based on the scope of claims. In addition, the technical scope of the disclosure includes all changes made within the meaning and scope equivalent to the scope of claims.

The present disclosure contains subject matter related to that disclosed in Japanese Priority Patent Application JP 2016-193286 filed in the Japan Patent Office on Sep. 30, 2016, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A moving object that moves on a road surface, the moving object comprising:
 a box-shaped accommodation unit that is provided on an outer surface of an automobile body, wherein
 the accommodation unit detachably accommodates a detection device for detecting suspended matters in an air nearby the automobile body,
 the accommodation unit includes
 a detection accommodation region in which the detection device is accommodated,
 a wiring accommodation region in which a wiring member connected to the detection device is accommodated,
 at least one detection rib provided at a position facing an outer edge of the detection accommodation region, the at least one detection rib restricts shaking of the detection device accommodated in the detection accommodation region,
an opening portion that is exposed to an outside, and
a housing door that covers the opening portion and is openable and closable,
positions of the detection accommodation region and the wiring accommodation region are different from each other in a placing direction when a direction from an inside of the accommodation unit to the outside through the opening portion is set as the placing direction.

2. The moving object according to claim 1,
wherein the at least one detection rib is included in a plurality of detection ribs, and the plurality of detection ribs includes
  a back surface abutting unit that positions the detection device in the placing direction,
  a wiring restriction unit that positions the wiring member in a restriction direction orthogonal to the placing direction, and
  a detection restriction unit that positions the detection device in the restriction direction.

3. The moving object according to claim 2,
wherein the housing door includes a door opening window, which is obtained by opening a portion at a position corresponding to a part of the detection device.

4. The moving object according to claim 1,
wherein the housing door includes a door opening window, which is obtained by opening a portion at a position corresponding to a part of the detection device.

5. The moving object according to claim 1,
wherein the wiring accommodation region is provided with a cable accommodation unit that accommodates a cable of the wiring member and a connector accommodation unit that accommodates a connector of the wiring member, and
end portions of the cable accommodation unit and the connector accommodation unit are linked to each other, and the cable accommodation unit and the connector accommodation unit extend along a bottom surface of the accommodation unit in directions different from each other.

6. The moving object according to claim 1,
wherein the accommodation unit has a wiring hole through which the wiring member is passed from the outside to the inside, and a tube hole through which a tube connected to the detection device is passed from the outside to the inside.

7. The moving object according to claim 1,
wherein the accommodation unit is mounted on a side surface different from a front surface of the automobile body.

8. The moving object according to claim 1,
wherein the accommodation unit is disposed between a front wheel and a rear wheel, which are mounted on the automobile body.

9. The moving object according to claim 8,
wherein slopes, which are obtained by cutting out portions facing the front wheel and the rear wheel, are provided in the accommodation unit.

10. The moving object according to claim 8,
wherein a width of the accommodation unit protruding from the automobile body in a width direction orthogonal to a side surface on which the accommodation unit is mounted is substantially the same as the width of the front wheel or the rear wheel.

11. The moving object according to claim 8,
wherein a color of an exterior surface of the accommodation unit is substantially the same as the color of the front wheel or the rear wheel.

* * * * *